US007445851B2

United States Patent
Friedrich et al.

(10) Patent No.: US 7,445,851 B2
(45) Date of Patent: Nov. 4, 2008

(54) HEAT-INSULATING LAYER SYSTEM

(75) Inventors: Christian Friedrich, Munich (DE);
Wolfgang Wachter, Munich (DE);
Detlev Stoever, Niederzier (DE);
Gerhard Pracht, Juelich (DE); Robert Vassen, Herzogenrath (DE); Bilge Saruhan-Brings, Troisdorf (DE);
Claus-Juergen Kroeder, St. Augustin (DE); Uwe Schulz, Neunkirchen-Seelscheid (DE)

(73) Assignees: MTU Aero Engines GmbH, Munich (DE); Forschungszentrum Juelich GmbH, Juelich (DE)

( * ) Notice: Subject to any disclaimer, the term of this patent is extended or adjusted under 35 U.S.C. 154(b) by 0 days.

(21) Appl. No.: 11/597,800

(22) PCT Filed: May 24, 2005

(86) PCT No.: PCT/DE2005/000944

§ 371 (c)(1),
(2), (4) Date: Mar. 15, 2007

(87) PCT Pub. No.: WO2005/116295

PCT Pub. Date: Dec. 8, 2005

(65) Prior Publication Data

US 2007/0248764 A1 Oct. 25, 2007

(30) Foreign Application Priority Data

May 26, 2004 (DE) .................. 10 2004 025 798

(51) Int. Cl.
*B32B 9/00* (2006.01)
*B32B 15/04* (2006.01)
(52) U.S. Cl. .................. 428/469; 428/472; 428/632; 428/701; 428/702

(58) Field of Classification Search ............. 428/701, 428/702, 632
See application file for complete search history.

(56) References Cited

U.S. PATENT DOCUMENTS

| 6,440,575 | B1 | 8/2002 | Heimberg et al. |
| 6,602,814 | B1 | 8/2003 | Gadow et al. |
| 2003/0148148 | A1 | 8/2003 | Dietrich et al. |
| 2004/0012152 | A1 | 1/2004 | Grunke et al. |
| 2006/0213435 | A1 | 9/2006 | Friedrich |

FOREIGN PATENT DOCUMENTS

DE    100 08 861    9/2001

(Continued)

OTHER PUBLICATIONS

C. J. Friedrich et al.; "Lanthanum Hexaaluminate Thermal Barrier Coatings"; Institute for Manufacturing Technologies of Ceramic Components and Composites, University of Stuttgart; Ceramic Engineering and Science Proceedings, Columbus OH USA; vol. 22 No. 4, 2001; XP009007230; pp. 375-382.

*Primary Examiner*—Timothy M Speer
(74) *Attorney, Agent, or Firm*—W. F. Fasse; W. G. Fasse

(57) ABSTRACT

A heat-insulating layer system for a metallic structural component, especially for a structural component of a gas turbine such as an aircraft engine, includes an adhesion promoting layer (12), an inner contact layer (14), and an outer cover layer (15), whereby the adhesion promoting layer (12). is disposed on a surface (11) of the gas turbine structural component (10). The inner contact layer (14) is formed of a zirconium oxide partially stabilized with yttrium or yttrium oxide, and the outer cover layer (15) is formed of a material that consists of at least one component with at least one phase, which stoichiometrically comprises 1 to 80 Mol-% $Mx_2O_3$, 0.5 to 80 Mol-% MyO and $Al_2O_3$ as a remainder with incidental impurities, wherein Mx is selected from the elements chromium and barium or mixtures thereof, and wherein My is selected from the alkaline earth metals, the transition metals and the rare earths or mixtures thereof.

6 Claims, 1 Drawing Sheet

FOREIGN PATENT DOCUMENTS

| | | |
|---|---|---|
| DE | 102 25 532 | 12/2003 |
| DE | 103 22 339 | 12/2004 |
| EP | 1 029 101 | 8/2000 |
| EP | 1 060 281 | 12/2000 |
| WO | WO99/42630 | 8/1999 |
| WO | WO2004/104378 | 12/2004 |

HEAT-INSULATING LAYER SYSTEM

FIELD OF INVENTION

The invention relates to a heat-insulating layer system for metallic structural components, especially for structural components of a gas turbine such as an aircraft engine, which structural components are subjected to high temperature or hot gas loads. Furthermore the invention relates to a structural component with such a heat-insulating layer system.

Metallic structural components of a gas turbine are provided with heat-insulating layers for protection against high temperatures and against hot gas corrosion. The DE 100 08 861 A1 discloses a heat-insulating layer system for a metallic structural component, whereby the heat-insulating layer system consists of a contact layer and a cover layer. The contact layer is located between an adhesion-promoting layer and the cover layer, whereby the adhesion-promoting layer is applied on the structural component. According to the DE 100 08 861 A1, the contact layer of the heat-insulating layer system consists entirely or predominantly of zirconium oxide partially stabilized with $Y_2O_3$ or of a glass-metal composite material, the cover layer consists of fully stabilized cubic zirconium oxide.

SUMMARY OF THE INVENTION

Beginning from this, the problem underlying the invention is to provide a novel heat-insulating layer system for metallic structural components, especially for structural components of a gas turbine such as an aircraft engine.

This problem is solved by a heat-insulating layer system according to the invention, wherein the inner contact layer is formed of a zirconium oxide partially stabilized with yttrium, yttrium oxide, calcium or magnesium, the outer cover layer is formed of a material that consists of at least one component with at least one phase, which stoichiometrically comprises 1 to 80 Mol-% $Mx_2O_3$, 0.5 to 80 Mol-% MyO and the remainder being $Al_2O_3$ with incidental or accidentally-occurring impurities, whereby Mx is selected from the elements chromium and barium or mixtures thereof, and whereby My is selected from the alkaline earth metals, the transition metals and the rare earths or mixtures thereof, preferably of magnesium, zinc, cobalt, manganese, iron, nickel, chromium, europium, samarium or mixtures thereof.

BRIEF DESCRIPTION OF THE DRAWINGS

Preferred further developments of the invention arise from the dependent claims and the following description. An example embodiment of the invention is explained in further detail in connection with the drawing, without being limited thereto. In that regard:

DETAILED DESCRIPTION OF AN EXAMPLE EMBODIMENT OF THE INVENTION

Figure 1:
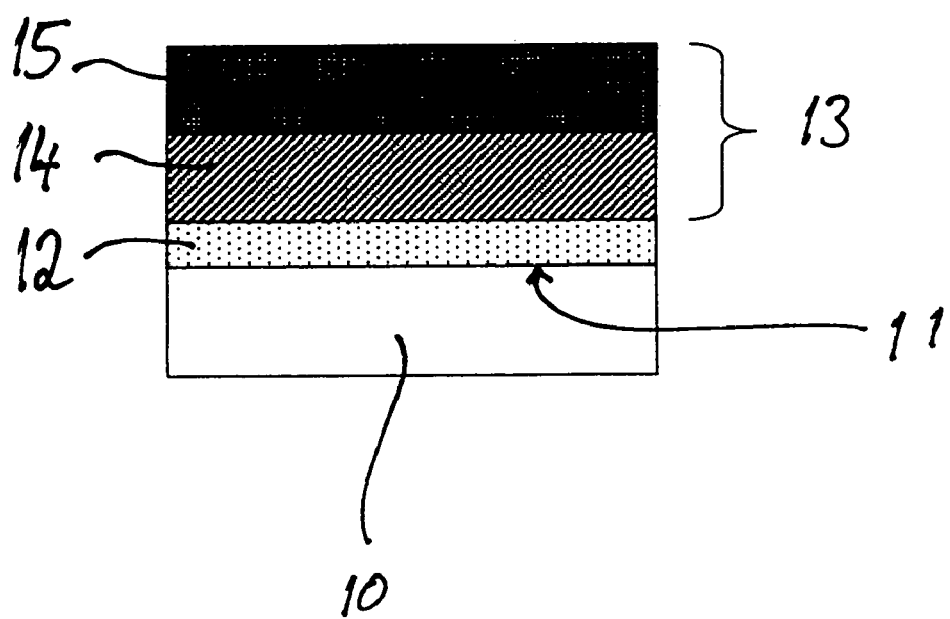
FIG. 1 shows a strongly schematized view of a heat-insulating layer system according to the invention for gas turbine structural components.

FIG. 1 shows, in a strongly schematized manner, a metallic structural component 10 of a gas turbine, whereby an adhesion-promoting layer 12 is applied onto a surface 11 of the structural component 10. A heat-insulating layer system 13 is applied onto the adhesion-promoting layer 12, whereby the heat-insulating layer system 13 comprises or encompasses an inner contact layer 14 and an outer cover layer 15.

The adhesion layer 12 applied onto the surface 11 of the metallic structural component 10 is embodied metallically and preferably embodied as an aluminum diffusion layer or as a platinum-aluminum diffusion layer or as a MCrAlY applied coating layer. The adhesion layer 12 increases the adhesion of the heat-insulating layer system 13 on the metallic structural component 10.

In the sense of the present invention, the inner contact layer 14 of the heat-insulating layer system 13 is formed of a zirconium oxide partially stabilized with yttrium, yttrium oxide, calcium or magnesium. The outer cover layer 15 of the heat-insulating layer system 13 is formed of a material that consists of at least one component with at least one phase, which stoichiometrically comprises 1 to 80 Mol-% $Mx_2O_3$, 0.5 to 80 Mol-% MyO and $Al_2O_3$ as a remainder with incidental impurities, wherein Mx is selected from the elements chromium and barium or mixtures thereof, and wherein My is selected from the alkaline earth metals, the transition metals and the rare earths or mixtures thereof.

In the sense of the present invention, thus there is proposed a heat-insulating layer system, which comprises or encompasses two layers, namely an inner contact layer of zirconium oxide partially stabilized with yttrium or yttrium oxide as well as an outer cover layer as described above.

Such a heat-insulating layer system with the inventive combination of the contact layer of partially stabilized zirconium oxide and the cover layer as described provides a particularly preferred heat-insulating layer system, which comprises an optimized adhesion on the structural component on the one hand, and an optimized thermal alternation resistance or durability on the other hand. Furthermore, structural components that are loaded by or subjected to high temperatures or hot gas and that are coated with the inventive heat-insulating layer system can be subjected to higher operating temperatures.

Due to the, in total, four-layered construction of the metallic structural component 10. metallic adhesion layer 12, contact layer 14 of partially stabilized zirconium oxide and cover layer 15, it is achieved that the thermal expansion coefficients between the individual layers are adapted to one another. Thus, stresses within the heat-insulating layer system are minimized.

The inventive heat-insulating layer system 13 or the contact layer 14 as well as cover layer 15 thereof are preferably applied onto the structural component 10 by thermal spraying or by a PVD (Physical Vapor Deposition) or EB-PVD (Electron Beam Physical Vapor Deposition) process or a CVD (Chemical Vapor Deposition) process. The individual methods for applying the layers are well known to the skilled worker being addressed here and thus do not require any further explanation.

The invention claimed is:

1. Heat-insulating layer system for metallic structural components of a gas turbine, comprising an adhesion-promoting layer (12) adapted to be disposed on a surface (11) of a gas turbine structural component (10), an inner contact layer (14) arranged on the adhesion-promoting layer (12), and an outer cover layer (15) arranged on the inner contact layer (14), characterized in that a) the inner contact layer (14) is formed of a zirconium oxide partially stabilized with yttrium, yttrium oxide, calcium or magnesium, and
   b) the outer cover layer (15) is formed of a material that consists of at least one component with at least one phase, which stoichiometrically comprises 1 to 80 Mol-% $Mx_2O_3$, 0.5 to 80 Mol-% MyO and $Al_2O_3$ as a remainder with incidental impurities, wherein Mx is selected from the elements chromium and barium or mixtures thereof, and wherein My as selected from the alkaline earth metals, the transition metals and the rare earths or mixtures thereof.

2. Heat-insulating layer system according to claim 1, wherein My is selected from the group consisting of magnesium, zinc, cobalt, manganese, iron, nickel, chromium, europium, samarium or mixtures thereof.

3. Heat-insulating layer system according to claim 1, wherein the adhesion-promoting layer (12) is a metallic layer.

4. Heat-insulating layer system according to claim 1, wherein the adhesion-promoting layer (12) is an aluminum layer or a platinum-aluminum layer or a MCrAlY-layer.

5. Heat-insulating layer system according to claim 1, wherein the gas turbine structural component is a metallic component.

6. Combination of a structural component of a gas turbine with a heat-insulating layer system according to claim 1.

* * * * *